UNITED STATES PATENT OFFICE.

EMIL MEYER, OF KÖPENICK, NEAR BERLIN, PRUSSIA, GERMANY.

IMPROVEMENT IN COMPOSITION FOR FORMING CEMENT, MORTAR COATINGS FOR WALLS, &c.

Specification forming part of Letters Patent No. 209,770, dated November 12, 1878; application filed May 31, 1878.

*To all whom it may concern:*

Be it known that I, EMIL MEYER, of Köpenick, near Berlin, in the Kingdom of Prussia, German Empire, have invented an Improved Mixture or Composition for Castings, Cements, and Coatings, of which the following is a specification:

This invention is based upon the intimate combination which takes place in a cold state between an alkaline silicate—that is to say, water-glass—in presence of water and fluorides of metals.

This invention is applicable in several ways. I employ fluor-spar, cryolite, or generally the fluoride of any metal in powder, either alone or with the addition of other pulverized mineral substances, in connection with water-glass powder or solution of various degrees of concentration.

First, I mix the matters together, in equal or other proportion, into a thick or a thin fluid paste, with or without water, and then run it into molds or into joints, or spread it over surfaces; second, I may apply the said ingredients separately and alternately, the one after the other.

According to the nature of the application, I add mineral powder or colors of any kind to the fluor-spar and to the soluble glass, to prevent the shrinking of the casting, to increase the adhesiveness, the strength, and the hardness of the product, and to provide coatings of any desired shade in durable colors.

The solution of water-glass will be of more or less strength, according to the porosity of the objects or articles to be treated.

The invention may be used for the making of durable castings, as cement, for closing joints or causing adhesion of substances, and also as a covering of wood, pasteboard, masonry, metals, or the like, to protect the same against atmospheric influences.

For use as a covering I prefer to first apply the fluor-spar, mixed with water or milk of lime, to the surface to be protected, and after this first coat is dry to cover it with concentrated solution of water-glass.

For the production of castings I apply a mixture of powdered fluor-spar and concentrated water-glass with a brush to the inner side of the mold, made preferably of glue charged with glycerine, and to throw a thin layer of sand upon the moist coating. After this dries I apply another coat of the mixture with a brush, throw in sand, and continue until the desired thickness has been obtained.

The proportions of the ingredients used may be varied, and should be regulated according to the purpose to which the mixture is to be applied in each instance.

I claim as my invention and desire to secure by Letters Patent—

The combination and composition of fluor-spar in a cold state with water-glass in presence of water, for making castings, cements, or coatings, substantially as specified.

This specification signed by me this the 3d day of May, 1878.

EMIL MEYER.

Witnesses:
FRIEDRICH CARL GLASER,
BERTHOLD ROI.